United States Patent [19]

Schulz et al.

[11] 4,364,240
[45] Dec. 21, 1982

[54] TEMPERATURE-DEPENDENT OUTPUT CONTROL FOR A HEAT PUMP ABSORBER

[75] Inventors: Siegfried Schulz, Dortmund; Karl-Günter Stroppel, Bochum; Bernd Meckel, Hagen, all of Fed. Rep. of Germany

[73] Assignee: Volkswagenwerk AG, Wolfsburg, Fed. Rep. of Germany

[21] Appl. No.: 261,807

[22] Filed: May 8, 1981

[30] Foreign Application Priority Data

May 16, 1980 [DE] Fed. Rep. of Germany ....... 3018709

[51] Int. Cl.³ .............................................. F25B 15/00
[52] U.S. Cl. ........................................ 62/476; 62/489
[58] Field of Search ................................. 62/476, 489

[56] References Cited

U.S. PATENT DOCUMENTS 4,314,668  2/1982  Jansen et al. ........................... 62/489

Primary Examiner—Lloyd L. King
Attorney, Agent, or Firm—Spencer & Kaye

[57] ABSTRACT

A parallel-bivalent apparatus functioning as an absorber heat pump and as a boiler for heating a heat carrying medium, includes a condenser, an evaporator, an absorber and an expeller forming the boiler. The heat carrying medium is passed through the absorber. The apparatus further includes a heat exchanger for poor and rich solutions. The heat exchanger receives poor solution from the expeller and applies the poor solution to the absorber through an expansion valve. A bypass conduit circumvents the heat exchanger and is arranged for carrying one of the solutions between the expeller and the absorber. A valve is contained in the bypass conduit for opening the bypass conduit when the flow temperature of the heat carrying medium falls below a predetermined value. Further, heat exchanging surfaces in the absorber are so dimensioned as to effect thereon condensation of flash gas generated by expansion of the poor solution upon passage through the expansion valve.

7 Claims, 3 Drawing Figures 4,364,240

TEMPERATURE-DEPENDENT OUTPUT CONTROL FOR A HEAT PUMP ABSORBER

BACKGROUND OF THE INVENTION

This invention relates to a parallel-bivalent apparatus which operates as an absorber-heat pump and as a boiler for heating a heat carrying medium. The apparatus includes an expeller which is also part of the boiler, a condenser, an evaporator and an absorber. The absorber through which the heat carrying medium passes, is supplied with a poor solution by the expeller, with the intermediary of a heat exchanger for poor and rich solution and an expansion value.

As opposed to known apparatus operating in the alternative-bivalent mode wherein at higher external temperatures (temperatures of the intake air) only the heat pump works and in case of lower temperatures below 0° C. only a conventional heater (containing the boiler) operates, an apparatus operating in the parallel-bivalent mode has the advantage that even at relatively low intake air temperatures the absorption heat pump is operative and the additional heat supplied by fuel has to be designed only to cover the output difference between the required heat output and the output delivered by the heat pump.

An apparatus operating in the parallel-bivalent mode of the above-outlined type is, in principle, disclosed in German Laid-Open Application (Offenlegungsschrift) No. 2,647,216 which, however, describes in detail only an apparatus equipped with a compression heat pump.

If the heat pump of the apparatus is to operate economically even at relatively low intake air temperatures, for example, at $-15°$ C., the output of the heat pump has to be increased as compared to known arrangements.

SUMMARY OF THE INVENTION

It is an object of the invention to provide an above-outlined apparatus operating in the parallel-bivalent mode which words economically even at low intake temperatures, that is, it yields a greater heat output than arrangements known heretofore.

This object and others to become apparent as the specification progresses, are accomplished by the invention, according to which, briefly stated, there is provided a bypass conduit for the rich solution or the poor solution; the bypass conduit circumvents the heat exchanger and is provided with a valve which opens the bypass conduit when the flow temperature of the heat carrier medium drops below a predetermined value and further, the heat exchanging surfaces in the absorber are so dimensioned that the flash gas generated downstream of the expansion valve by the expansion of the poor solution is, by virtue of cooling, again absorbed at the absorber surfaces.

The particular advantage of the invention resides in that the object of the invention is resolved by very simple means, namely by the provision of a temperature-controlled valve in a bypass conduit.

Thus, the invention provides for an increase of the absorber output by ensuring that as the flow temperature drops below a predetermined value, that is, when a heat supply (input) deficiency is present, a bypass circumventing the heat exchanger becomes effective, so that the heat which is usually transferred within the heat exchanger to the rich solution, is transferred within the absorber to the heat carrying medium which, as a rule, is heating water. More particularly, downstream of the expansion valve of the absorber, that is, at the inlet of the absorber, there occurs an expansion of the hot poor solution which in one embodiment of the invention is supplied by means of the bypass conduit and flash gas is released as a result of the expansion-evaporator. At the same time, the poor solution cools down to the boiling temperature at the pressure prevailing in the absorber. At the heat exchanging surfaces in the absorber, that is, at the upper surface of a coil-shaped conduit system through which the heat carrying medium to be heated flows, cooling occurs, by means of which the flash gas is again absorbed. The thus-released absorption heat is additionally transferred to the heat carrying medium which, accordingly, is heated to a greater extent than in normal operation in which the valve provided in the bypass conduit is in a closed state and thus the bypass conduit is inoperative.

It is to be understood that for practicing the invention, the respective heat transfer surfaces of the absorber have to be sufficiently large and further, the heat output of the expeller has to be coordinated accordingly.

According to a further feature of the invention, the flue gases of the expeller pass through a condensation heat exchanger for the flue gas and the intake air, situated upstream of the evaporator. This arrangement is advantageous due to the fact that at low air intake temperatures the danger of icing of the evaporator which adversely affects the operation of the heat pump is paticularly great. By providing a condensation heat exchanger for the flue gas and the intake air, the flue gas, in that heat exchanger, transfers its condensation heat to the intake air introduced into the evaporator. This effects, on the one hand, a desired heat-up of the intake air and, on the other hand, brings about a drying of the flue gases which, after having flowed through the condensation heat exchanger, are expediently combined with the intake air.

DESCRIPTION OF THE PREFERRED EMBODIMENTS

At the outset it is noted that in all the Figures the conduits, dependent upon the type and phase of fluid they carry, are differently coded. Thus, conduits shown in solid dual (parallel) lines handle the refrigerant, such as $NH_3$, in the gas phase. The conduits shown as single solid lines carry the refrigerant in the liquid phase. Conduits shown with solid lines with dots placed in them carry the poor solution, whereas dash-dotted conduits carry the rich solution. Conduits shown in relatively long dashes are provided for the heat carrying medium, which, as a rule, is heating water. Conduits shown in relatively short dashes designate air pipes. The flue gases flow through conduits shown as solid lines crossed by slanted dash pairs.

Figure 1:
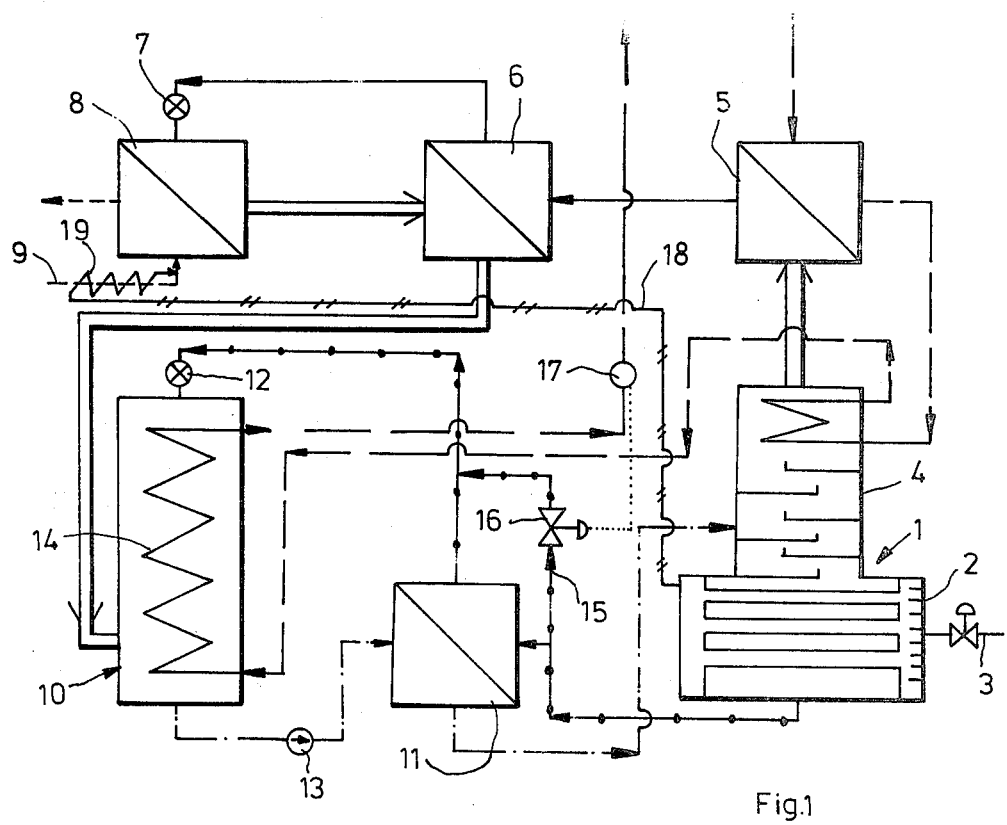
FIGS. 1, 2 and 3 are schematic illustrations of three preferred embodiments of the invention.

Turning now to the apparatus illustrated in FIG. 1, there is shown an expeller generally indicated at 1, including an expeller sump 2 into which heating medium is introduced at 3 as well as a rectifying column 4. The apparatus further has a condenser 5 in which the hot refrigerant vapor transmits condensation heat to the heating water, a heat exchanger 6, an expansion valve 7 and an evaporator 8 in which the refrigerant to be evaporated takes up heat from the intake air introduced by means of an intake air conduit 9. The apparatus further includes an absorber 10 to which there is applied a poor solution from the expeller sump 2 with the intermediary of a heat exchanger 11 for the poor and rich solutions and an expansion valve 12.

Thus, in the heat exchanger 11 there occurs a heat transfer from the hot poor solution to the rich solution driven from the absorber 10 by means of a pump 13. This heat transfer results in a cooling of the poor solution which, within the absorber 10, transfers absorption heat to the heating water flowing through a coil 14.

For increasing the heat output of the absorber 10, a bypass conduit 15 is provided which connects the expeller 1 to the absorber 10 with the circumvention of the heat exchanger 11. The bypass conduit 15 contains a valve 16 which is controlled by a temperature sensor 17, measuring the flow temperature of the heating water. In response to a predetermined flow temperature, indicating an output deficiency, the valve 16 is set into an open state by appropriate sensor signals. As a result of opening the bypass conduit 15 by means of the valve 16, there is a direct flow of the hot poor solution from the expeller 1 to the expansion valve 12, so that at the expansion valve 12 the hot poor solution is expanded while flash gas is released. The outer surface of the coil 14 is so dimensioned that by means of the heating water a cooling is effected which leads to the absorption of the flash gas. The absorption heat is thus additionally transferred to the heating water.

For reducing the danger of icing in the evaporator 8, the flue gases of the expeller 1 are admitted through a flue gas conduit 18 to the condensation heat exchanger 19 so that there the condensation heat of the flue gases is transferred to the intake air and thus the evaporation temperature is increased. Also, at the same time a drying of the flue gases occurs which, after passing through the heat exchanger 19 are combined with the intake air entering the evaporator 8.

Thus, according to the invention the hot poor solution is utilized as a heat transfer medium and one part of the absorber surface is utilized for removing heat from the poor solution.

Figure 2:
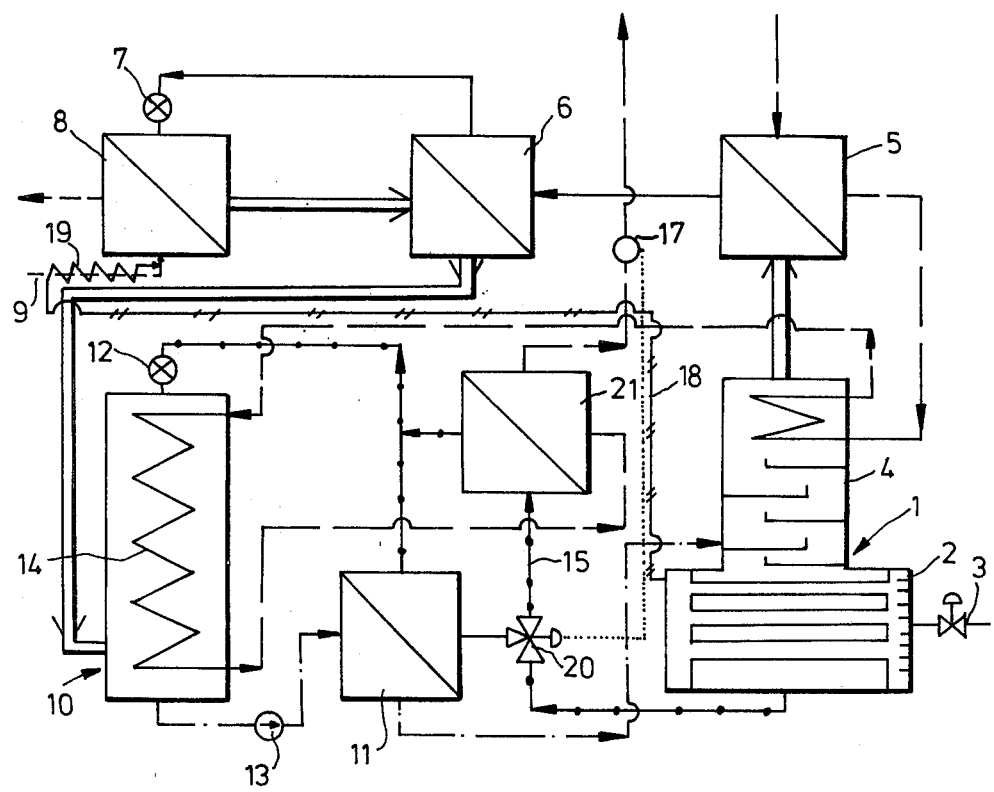

The above-described results are also achieved by a second preferred embodiment illustrated in FIG. 2. The FIG. 2 embodiment differs from the embodiment described in conjunction with FIG. 1 in that the bypass conduit 15 includes in its path a heat exchanger 21 which may be rendered operative by a three-way valve 20 actuated as a function of the flow temperature. As an output deficiency occurs, that is, as the flow temperature drops, the heat exchanger 21 provides for a heat transfer from the hot poor solution to the heating water. The three-way valve 20 is so designed that upon dropping of the flow temperature, partial streams of the poor solution are directed through both heat exchangers 11 and 21 which are recombined upstream of the expansion valve 12 and thus upstream of the absorber 10. The magnitude of the partial streams as well as the heat exchangers 11 and 21 are so designed that after recombination of the two partial streams upstream of the expansion valve 12 there is obtained a temperature of the poor solution which is above the boiling temperature of the poor solution at the pressure prevailing in the absorber 10. As a result, in this embodiment too, the same effects are obtained in the absorber 10, as described in connection with the FIG. 1 embodiment. It is to be understood that the absorber 10 has to be so designed that it is capable of transferring to the heating water the additional heat which is to be exchanged by means of the absorption of the flash gas.

Figure 3:
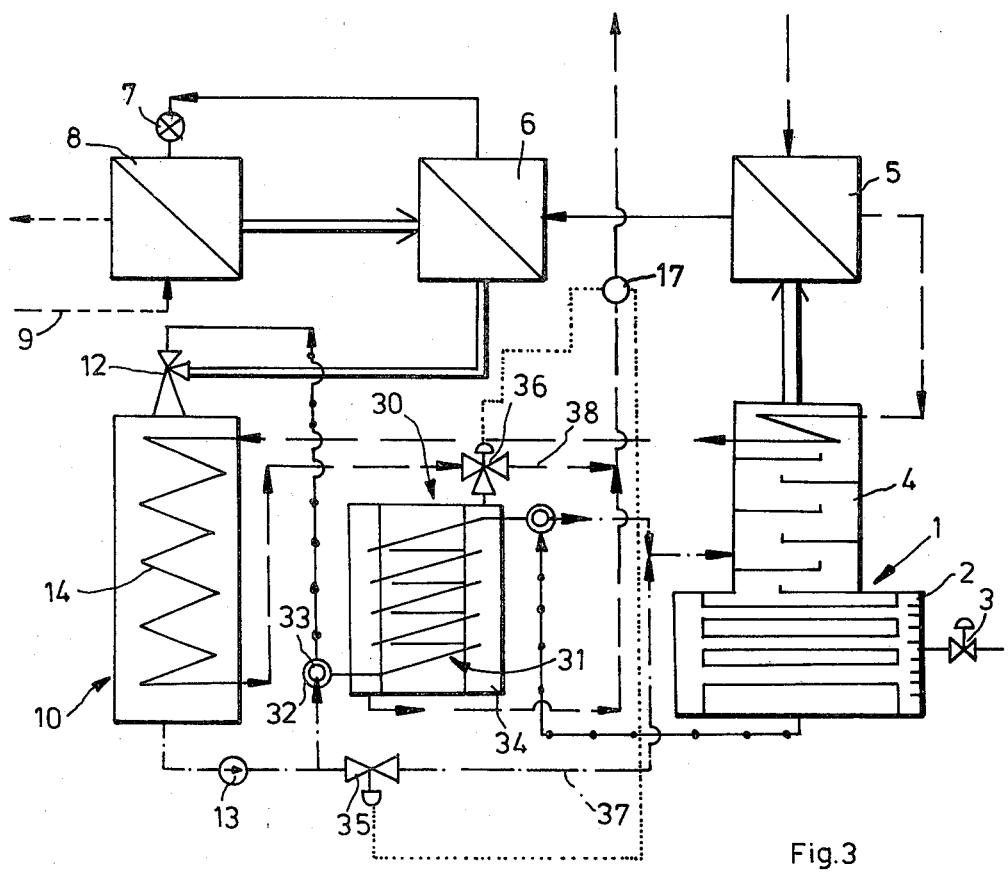

Turning now to FIG. 3, two heat exchangers, namely the heat exchanger for the rich solution and the poor solution as well as a heat exchanger for the poor solution and heating water are combined into a triple heat exchanger 30. The triple heat exchanger 30 contains a coaxial coil heat exchanger 31, the outer coil 32 of which carries the poor solution and the inner coil 33 of which carries the rich solution. The coaxial heat exchanger 31 is situated in the jacket chamber 34 through which heating water flows.

The apparatus illustrated in FIG. 3 has two valves 35 and 36 which are controlled by the flow temperature. The valve 35 is located in a bypass 37 for the rich solution. The bypass 37 directly connects an outlet of the absorber 10 to an inlet of the expeller 1 with the circumvention of the triple heat exchanger 30. The valve 36 is a three-way valve 36 which, when the flow temperature falls below a predetermined value, is, similarly to the valve 35, actuated and thus shuts off a bypass 38 for the heating medium, so that when the heating medium takes up heat from the poor solution in the heat exchanger 30 while, at the same time, the rich solution circumvents the heat exchanger 30 by means of the bypass 37. Instead of an on-off operation it is feasible to provide a division into partial streams.

It is to be understood that it is feasible to alter the FIG. 1 embodiment in such a manner that the hot poor solution flows continuously through the heat exchanger 11, while a bypass is provided for the rich solution delivered by the pump 13.

It will be understood that the above description of the present invention is susceptible to various modifications, changes and adaptions, and the same are intended to be comprehended within the meaning and range of equivalents of the appended claims.

What is claimed is:

1. In a heat pump for heating a heat carrying medium including an expeller, a condenser connected to said expeller for receiving hot refrigerant vapors from said expeller, an evaporator operatively connected with said condenser for receiving liquid refrigerant from said condenser, a heat exchanger for poor and rich solutions connected to said expeller for receiving poor solution from said expeller; an absorber connected to said heat exchanger for receiving poor solution from said heat exchanger through an expansion valve; said absorber being further connected to said expeller with the intermediary of said heat exchanger for applying rich solution from said absorber to said expeller; and heat exchanging conduit means arranged in said absorber for passing heat carrying medium through said absorber; the improvement comprising a bypass conduit connecting said expeller with said absorber and circumventing said heat exchanger for carrying one of said solutions between said expeller and said absorber with the circumvention of said heat exchanger; a valve contained in said bypass conduit; said valve having an open state in which communication is maintained through said bypass conduit between said expeller and said absorber; said valve having a closed state in which communication is blocked through said bypass conduit between said expeller and said absorber; temperature sensing means for responding to the flow temperature of the heat carrying medium exiting from said absorber; said temperature sensing means being connected to said valve for setting said valve into said open state when said flow temperature falls below a predetermined value; further wherein said heat exchanging conduit means have, within said absorber, heat exchanging surfaces so dimensioned as to effect thereon consideration of flash gas generated by expansion of the poor solution upon passage through said expansion valve.

2. The improvement as defined in claim 1, further comprising air conduit means entering into and leading out of said evaporator for passing air through said evaporator; an additional heat exchanger connected to said air conduit means upstream of said evaporator as viewed in the direction of air flow in said air conduit means, and a further conduit means carrying flue gases from said expeller to said additional heat exchanger, whereby the flue gases heat the air in said air conduit means prior to introduction of the air into said evaporator.

3. The improvement as defined in claim 1, wherein said bypass conduit connects an output of said expeller with an input of said absorber for carrying poor solution from said expeller towards said absorber.

4. The improvement as defined in claim 3, further comprising an additional heat exchanger connected in the flow path of said bypass conduit, means passing said heat carrying medium, exiting from said absorber, through said additional heat exchanger; said valve being a three-way valve arranged to direct, in said open state, partial streams of the poor solution into both heat exchangers in such distribution, that upon recombination of said partial streams downstream of said heat exchangers and upstream of said absorber there is obtained a temperature which is higher than the boiling temperature of the poor solution at a pressure prevailing in said absorber.

5. The improvement as defined in claim 1, wherein said bypass conduit connects an output of said absorber with an input of said expeller for carrying rich solution from said absorber towards said expeller.

6. The improvement as defined in claim 5, further comprising conduit means for passing the heat carrying medium, exiting from said absorber, through said heat exchanger, whereby said heat exchanger is a triple heat exchanger; an additional valve contained in said conduit means between said absorber and said triple heat exchanger and an additional bypass conduit connected to said additional valve and circumventing said triple heat exchanger; said additional valve having a first state for directing the heat carrying medium from said absorber into said triple heat exchanger; said additional valve having a second state for directing the heat carrying medium from said absorber into said additional bypass conduit with the circumvention of said triple heat exchanger; said temperature sensing means being operatively connected to said additional valve for setting said additional valve from said second state into said first state when said flow temperature falls below the predetermined value.

7. The improvement as defined in claim 6, wherein said triple heat exchanger includes an outer coil for carrying the poor solution, an inner coil arranged coaxially with respect to the outer coil and carrying the rich solution and a jacket containing said coils and accommodating the heat carrying medium.

* * * * *